Sept. 24, 1968 R. WOODACRE 3,402,440
ADJUSTABLE SNAP FASTENER
Filed Aug. 18, 1966
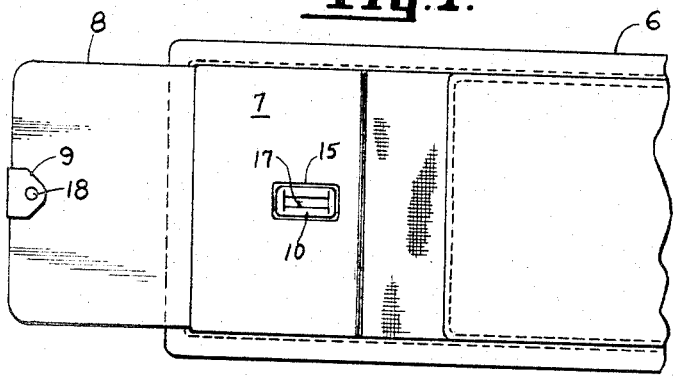
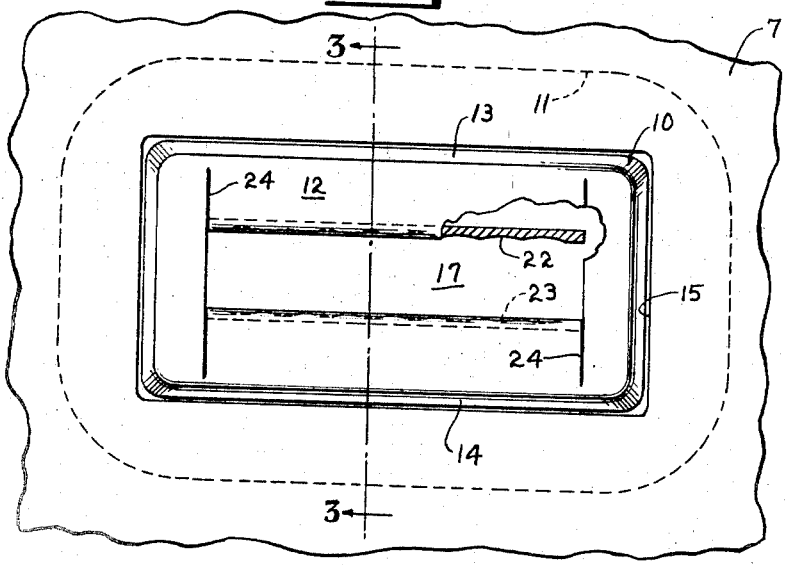
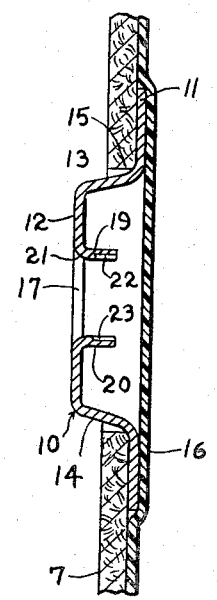
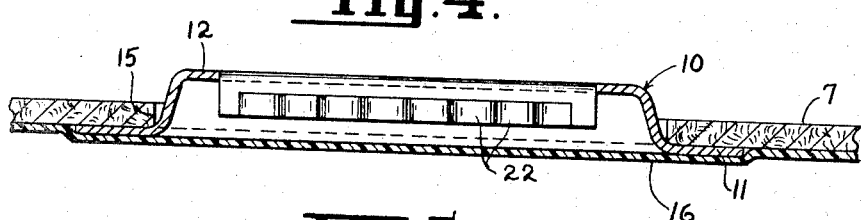
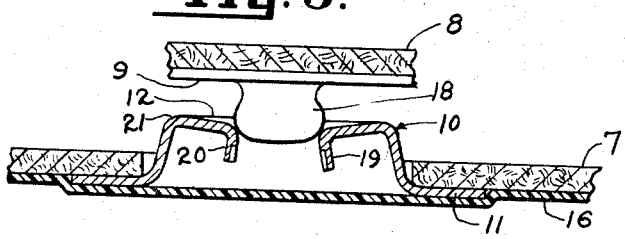

United States Patent Office 3,402,440
Patented Sept. 24, 1968

3,402,440
ADJUSTABLE SNAP FASTENER
Richard Woodacre, Waterbury, Conn., assignor to Scovill Manufacturing Company, Waterbury, Conn., a corporation of Connecticut
Filed Aug. 18, 1966, Ser. No. 573,282
1 Claim. (Cl. 24—206)

ABSTRACT OF THE DISCLOSURE

An adjustable snap fastener has an elongated resilient socket member to cooperate with a rigid stud. The socket has a front wall spaced outwardly from a base, the front wall having a slot-like opening with depending flanges having recesses for holding the stud at various points, and slits in the front wall extend from the slot for added flexibility.

---

This invention is an adjustable snap fastener which is especially useful on card cases sometimes employed in combination with a wallet.

Generally speaking, such a fastener permits a pair of overlapping flaps to be attached together in any one of several positions. As applied to a card case or wallet, my invention provides an elongated resilient socket structure secured to the pocket wall panel and a rigid stud secured to the flexible closure flap, the stud being selectively engageable with the socket at a number of positions to provide means for adjusting the capacity of the pocket.

It is an improvement over presently used devices for this purpose, one example of which is seen in the Burniski Patent 3,029,854. Another wallet on the market has a fastener utilizing a molded plastic part with several holes, each of which constitutes a separate socket element. Both of these structures have objections and both are relatively expensive as compared to the fastener combination described and claimed herein.

In the Burniski closure, the stud can slide freely so that the closure flap is never retained securely except in the most expanded position. In the device with a plastic molded part, there is no easy adjustment at all.

In my improved fastener, there is an elongated resilient structure which is economically made in one piece of sheet metal; which will allow for shifting or adjustment of the stud along the length of the socket opening and which will yieldingly retain the stud in any desired position.

In the relatively old patent Marendowski 1,200,743 there is a suggestion of a sheet metal socket structure capable of holding the stud in any of several positions. However, as the patent states, the stud cannot slide along the socket, but must be inserted in one position and removed from that same position. Furthermore, all forms shown in this patent are comparatively difficult to make and none of them presents a smooth-surfaced socket which is a desirable feature of such a fastener, particularly when used on such articles as mentioned above.

Other objects and advantages of the invention will hereinafter more full appear.

In the accompanying drawing, I have shown for purposes of illustration, one embodiment which the invention may assume in practice. In the drawing:

FIG. 1 is an open view of a portion of a wallet equipped with a fastener according to the invention;

FIG. 2 is an enlarged view of the socket structure of the fastener, partially broken away;

FIG. 3 is a cross-section on line 3—3 of FIG. 2;

FIG. 4 is a longitudinal central section through the socket structure; and

FIG. 5 is a transverse section showing the action of the fastener when a stud is being inserted in the socket opening.

The wallet, generally designated 6, has a card-carrying pocket with a relatively fixed panel or wall 7 and a flexible closure flap 8 which is adapted to be folded over the wall 7. In general, the fastener consists of a rigid stud element 9 fixed to the flap 8 and an elongated resilient socket structure 10 fixed to the panel 7.

The socket is a unitary sheet metal piece having a flat base 11, a front wall 12 generally parallel to and spaced outwardly from the base 11 and joined to such base by the side sections 13 and 14. The socket may be secured to the panel 7 in any of several ways. The preferred method is to provide a hole 15 in the panel 7 of a size to fit around the outwardly projecting portion of the socket with the base 11 resting against the inner surface of the panel 7. The socket member thus has a neat appearance and can be held in place by any suitable means such as a layer of material 16 adhesively secured to the panel 7.

An elongated opening 17 in the front wall 12 is of a size adapted to snugly receive the bulbous head 18 of the stud. A pair of laterally spaced and laterally yieldable flanges 19 and 20 extend inwardly from the side edges of the opening 17 substantially perpendicular to the front wall 12, being joined thereto by rounded sections 21 to assist in guiding the stud into the opening. Along the surfaces of the flanges 19 and 20 facing toward the opening, there are provided a plurality of recesses 22 in the flange 19 and similar recesses 23 in the flange 20, each recess in one flange being directly opposite a recess in the other flange. These recesses are preferably formed by pressing or embossing them into the material so as to harden the surfaces.

In order to increase the flexibility of the front wall 12 and the flanges 19 and 20, the front wall has the slits 24 extending laterally in opposite directions from each end of the opening 17.

The manner of engagement as seen in FIG. 3 shows on an exaggerated scale, how the front wall and flanges may flex during the insertion and removal of the stud.

It will be evident that the stud may be inserted easily in any one of several positions along the length of the opening 17. After being initially engaged in the opening, the stud may be moved along the recess by snapping from one to the other without removing the stud from the opening. This permits the closure flap 8 to be tightened securely around the pocket contents.

What I claim is:
1. An adjustable snap fastener for a pair of overlapping flaps comprising a rigid stud adapted to be secured to one flap and an elongated resilient socket member adapted to be secured to the other flap, said socket member having
   (a) a base;
   (b) a front wall generally parallel to and spaced outwardly from said base;
   (c) said front wall having an elongated slot-like opening of a width to adapt it to snugly receive said stud at any of various places along the length of said slot and slits in such front wall extending laterally in opposite directions from each end of such slot-like opening;
   (d) a pair of laterally spaced and laterally yieldable flanges extending inwardly from the side edges of said opening and along substantially the entire length of the opening, said flanges being substantially perpendicular to said front wall;

(e) at least one of said flanges having a series of recesses in the surface thereof which faces said opening, such recesses being closely spaced along the length of such flange or flanges;

(f) whereby said stud may snap into engagement with any of said recesses and thereafter be adjusted along the length of said opening by snapping from one recess to another without removing the stud from said opening.

References Cited

UNITED STATES PATENTS 3,301,296  1/1967  Meyer _____ 150—39

BOBBY R. GAY, *Primary Examiner.*

R. SIMONSEN, *Assistant Examiner.*